Sept. 20, 1960  H. A. SIMPSON  2,952,951
ABRASIVE OR LIKE MATERIALS AND ARTICLES
Filed July 24, 1953  2 Sheets-Sheet 1
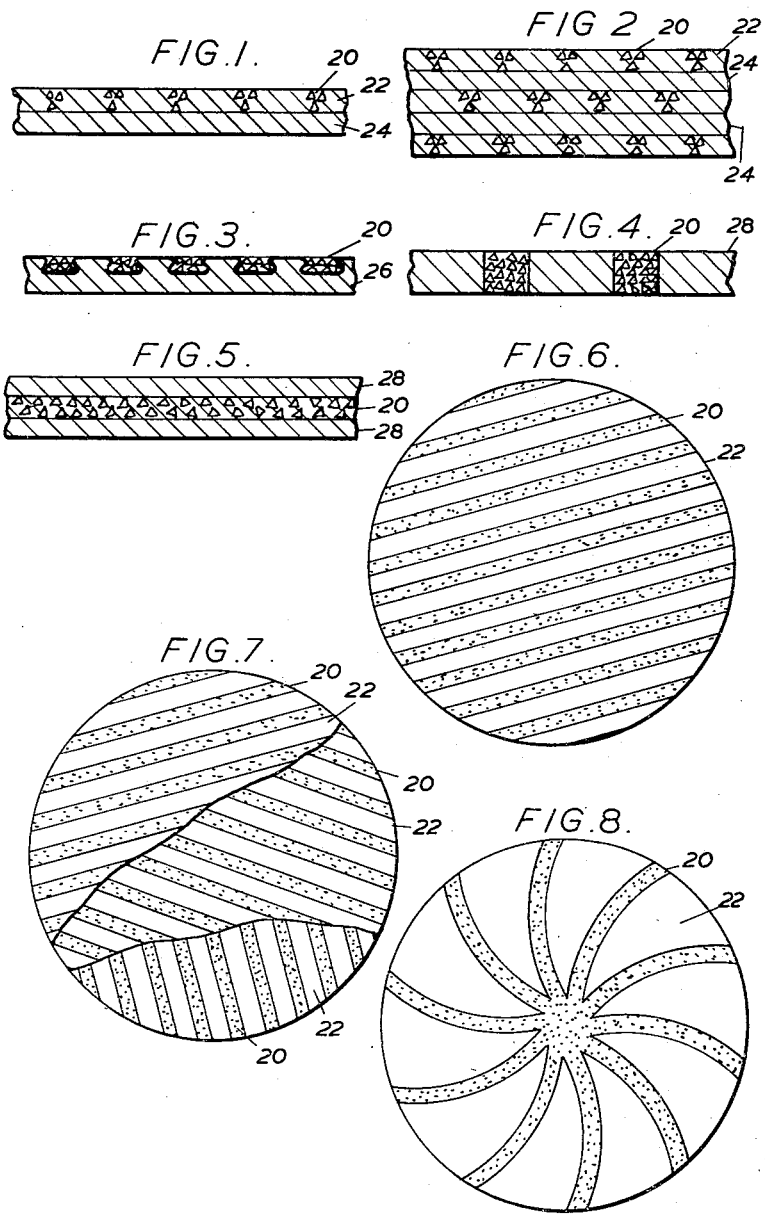
Inventor
Harry Arthur Simpson
By
Dowell & Dowell
Attorney Sept. 20, 1960 H. A. SIMPSON 2,952,951
ABRASIVE OR LIKE MATERIALS AND ARTICLES
Filed July 24, 1953 2 Sheets-Sheet 2
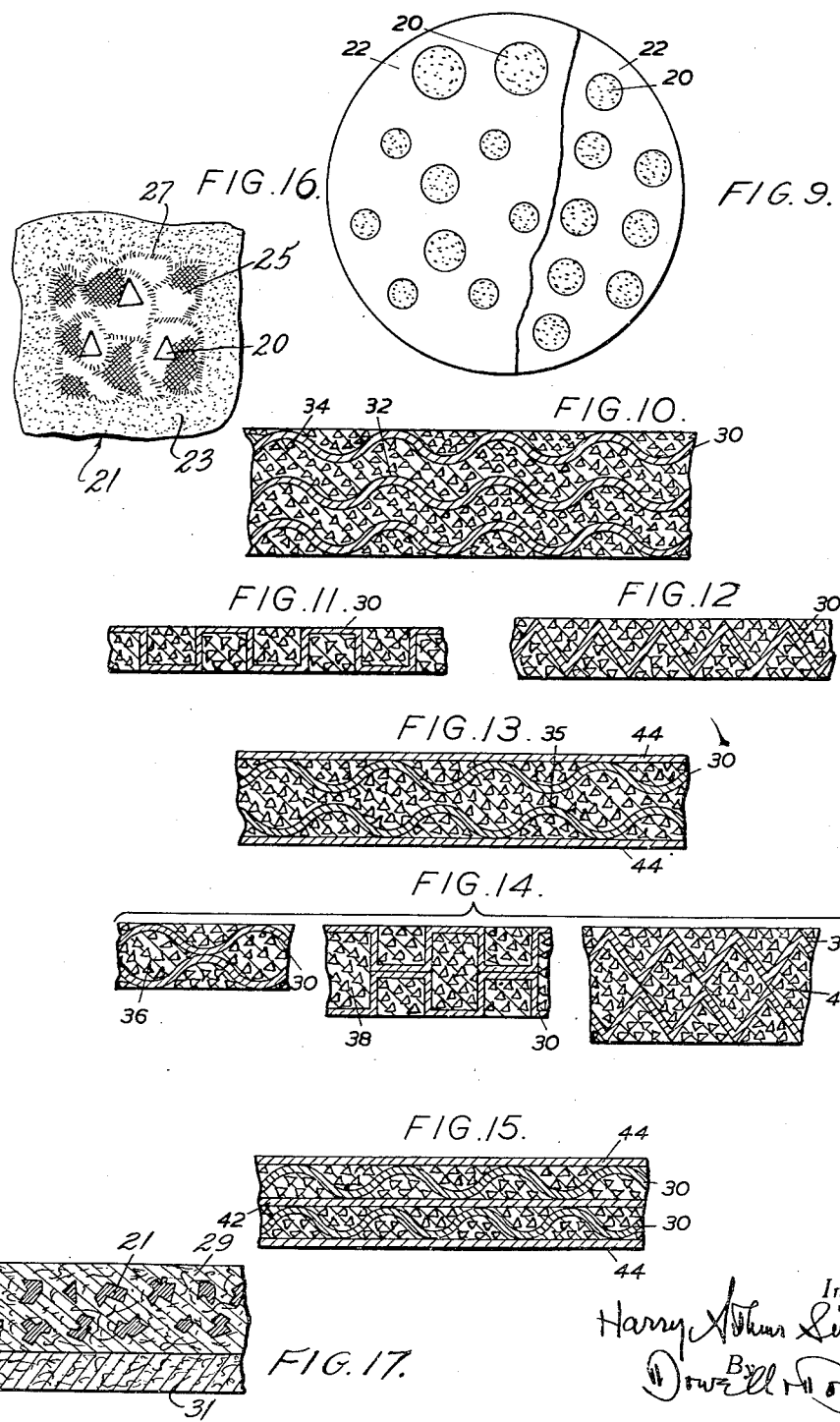

United States Patent Office 2,952,951
Patented Sept. 20, 1960

2,952,951
ABRASIVE OR LIKE MATERIALS AND ARTICLES

Harry Arthur Simpson, Epsom, England. (6 Queens Keep, Clarence Parade, Southsea, Hampshire, England)

Filed July 24, 1953, Ser. No. 370,073

Claims priority, application Great Britain July 28, 1952

10 Claims. (Cl. 51—193)

This invention relates to abrasive materials and elements such as discs or wheels made from or of abrasive materials which are used for grinding, cutting, polishing and like processes.

Known abrasive materials and articles made therefrom, such as grinding discs, of the kind which have substantial mass and are of a thickness which present grinding faces to the work on their peripheries as well as their side faces are brittle and tend to break up in use thus presenting uneven grinding surfaces to the work which prevents accurate grinding being effected. Further such known articles, for example grinding discs, consist of the grain compacted by a glue into a mass and in use the refuse of the work from the grinding fills up the pores between the abrasive grains which thus become smooth and therefore less efficient, while the clogged grains do not wear away in use so that once clogged the life of the article, still having unused grain is discarded or has to be unclogged to enable it to be used further.

The object of this invention is to provide abrasive elements of the above kind which have a longer cutting life, retain an unbroken cutting surface for accurate work, being tough and having longer flexiblity are suitable for high speed cutting discs, and have less tendency to clogging than the known materials and articles.

According to the present invention abrasive elements in sheet or similar form are made up of a series of layers, rows or other formations of abrasive grains separated by non-abrasive material whereby in use the elements provide a saw action.

The elements can consist of a three dimensional mass such as a sheet or disc of a carrying medium and a bonding medium with or without fillers and/or plasticizers in which definite major formations such as layers or rows of abrasive grains are arranged.

The carrying medium may consist of corrugated materials generally of sheet form, or of cut-lengths or other masses of fibrous or non-fibrous materials which can be treated as by heating to fray or roughen them and they can be interspersed to provide a knitted mass. This medium may be of woven or unwoven natural fibres such as cotton, jute or asbestos, or of synthetic woven or unwoven fabrics such as of nylon, viscose, vinyl compounds or glass, or of natural solid materials such as wood, cotton, wool or asbestos, or of synthetic solid materials such as nylon, impregnated products e.g. phenol formaldehyde resin bonded glue or moulding material, viscose, glass fibre, or vinyl compound, or they may be of metallic materials such as copper, brass or steel gauze or perforated or expanded sheet metal or any other suitable solid sheet or bonded lengths, or they may be made of a mixture of any or all of such materials. An example of woven natural fibrous materials is what is known as "corset cuttings."

All these materials may be bonded or locked or impregnated by natural glues, whether animal or vegetable e.g. dextrine, rubber latex or the like. Or synthetic glues such as phenol/cresol formaldehyde, phenol-formaldehyde resin, urea formaldehyde resins, or alkyd or other thermo-setting or plastic type glues may be employed, e.g. vinyl resin, or a combination of these glues may be employed. Where a fibrous carrying medium is employed it may be heated or otherwise treated to fray or roughen them and they may be interspersed to form a knitted intertwined or felted mass; it will be understood that the fibres may be locked or bonded by heat treatment or by employing their solvents in suitable proportions, according to the fibres used.

The abrasive materials employed may be natural materials such as sand, emery, garnet, or they may be of synthetic materials such as aluminous oxide, silicon carbide, or they can be of any other known suitable abrasive material.

In making elements such as sheets or discs of abrasive material according to the invention, the carrying medium is wetted if required by any suitable wetting agent such as water or furfural, and impregnated as by dipping or spraying with the bonding medium. Where liquid phenol-formaldehyde resin glues are used these do not require wetting agents.

Suitable fillers or plasticizers may be added if required and the whole thoroughly intermixed as by agitation or stirring to produce a substantially homogeneous mix. Examples of suitable fillers are finely divided chalk, wood flour, slate, coconut shell or bentonite.

This mix, if it is too bulky or too freely flowing may be dried in any suitable manner until it is in a suitable state for moulding, pressing or otherwise bonding together. Where the bonding material is in powdered form, water, known wetting agents such as furfural, or solvents such as acetone for spirit soluble resins may be stirred into the mix to produce a cut-lengths mass of the desired viscosity.

It will be understood that lubricants such as camphor, stearates or wax, plasticizers such as phosphates e.g. tricresyl phosphate, phthalates, or a mixture of such materials may be added to the mix to assist in producing the desired viscosity and even to ensure that the finished discs or the like made from the mix possess the desired degree of flexibility.

The mix having been brought to the desired viscosity and tacky state for moulding, pressing or otherwise compressing, is then introduced into moulds and provided mechanically or manually with the rows or layers or other grain formations.

The grain formation may take any desired configuration. It may consist of rows across the mix, of spots or blobs of grain arranged in rows all equi-spaced in rows or irregularly spaced. The rows whether complete lines or in spots may run substantially straight across the mix or in curved lines, crossing lines or in any configuration desired. In the case of discs the lines may be chords, radial, spiral or of other loci. Where blobs or the like are used these may be all the same size, or in alternate large and small blobs which are staggered in adjacent rows, and so on. The abrasive rows, spots or the like may also vary in thickness through the mix.

Further the finished elements may be in the form of superposed layers in which the rows, spots or abrasive formations are staggered in adjacent layers or they may run across each other at various angles.

In making such elements, the layer is first spread or filled into a mold and the grains are then embedded in it in the desired configuration or the layer may be indented and the grains put in the indentations.

Also each layer can consist of grain blocks on the surface or embedded in the elements, said blocks being in formations such as rows or spots and built up or preformed to shape for moulding. The form of saw action desired in the finished articles will dictate the directions in which the blocks of abrasive are orientated. In the case of coarse grain it may be necessary to use filling-in pieces of non-abrasive material between rows, spots or the like of grain.

Where corrugated materials are employed they may be made by any suitable process such as by pressing, heating or crimping and may be of paper, card, papier maché or any other suitable substance which will wear away in use leaving the abrasive material exposed for grinding, cutting, polishing or like purposes with a saw-like action.

Examples of articles or materials according to the invention are shown in the accompanying drawings where like numerals show like parts.

Fig. 1 shows a partial cross section showing a single layer made up of grains 20, separated by non-abrasive portions 22, the non-grain material forming a backing layer 24.

Fig. 2 shows a similar cross section to Fig. 1, but with a number of superposed layers of abrasive mass and material softer than abrasive grain, the layers being separated by the entirely non-grain layers 24. The grain portions of each layer are staggered with respect to those in the next layer, so that for grinding, different zones are constantly engaging the work being ground and thus even grinding is achieved.

Fig. 3 shows a cross section of a single layer as in Fig. 1 in which the non-grain layer 26 is corrugated and the grain is embedded in the valleys of the corrugations. After the application of pressure before or during the moulding treatment the grains 20 are embedded in the non-grain material which is pressed over them. Several such layers may be superposed in a manner similar to Fig. 2.

Fig. 4 shows a thick non-grain layer 28 having vertical slots or holes or both right through it which are filled with abrasive mass. A similar method may be used as in Fig. 5 showing an edge cutting disc with horizontal slots or holes in a thick non-grain layer 28 filled with grains 20 which present at the disc edge abrasive areas separated by non-abrasive areas; or such slots or holes may run obliquely through the non-grain layer.

Fig. 6 shows a plan o a disc having lines of grain 20.

Fig. 7 shows a plan similar to Fig. 6 with layers partly cut away to show the grain lines in different layers being angularly arranged with respect to the other layers.

Figs. 8 and 9 show similar plans to Fig. 6 with the grain lines 20 arranged in Fig. 8 spirally and in Fig. 9 in blobs of equal size and different sizes. The formations shown in Figs. 8 and 9 may be arranged in multiple layers as in Fig. 7 as will be understood.

Figs. 10–15 show further cross sections of sections of materials or articles according to the invention showing the interpositioning of corrugated sheets or layers of non-abrasive material between layers of abrasive material.

Fig. 16 is a greatly enlarged view of part of an abrasive block provided in the elements according to the invention; and, Fig. 17 is a cross section through part of an abrasive element showing the fibrous material, grit and bonding medium homogeneously mixed as shown in Fig. 16 and mounted on a backing member of fibrous material and bonding medium.

The grains can first be mixed with a bonding medium and this mix is inserted in the mould.

Alternatively the elements may be manufactured by the known methods of making paper or the like from pulp or by the known preforming pulp moulding processes. In conventional paper making the fibrous material together with ingredients, pigments or fillers and bonding medium as is known is dispersed in water and called a slurry. This slurry is passed over a gauze and a vacuum is caused to suck through the gauze thus drawing the water through the holes and at the same time depositing the fibrous material on the gauze. This fibrous material is allowed to build up to the required thickness and is then drawn off in continuous sheet form.

One method of controlling abrasive grain orientation on sheet material of the carrying medium mix above described is to allow the fibrous material only to build up to a thickness sufficient to form a continuous sheet and then pass this sheet material over a further gauze which is situated with one side in an abrasive grain slurry; it is on this side that the pulp will adhere for the vacuum will be drawn through the water, through the pulp, through the gauze and out on the other side. The orientation of the holes on this second gauze, which may be shaped for the major formations of grain required depends on the shape or design of the abrasive pattern on the pulp for when the vacuum is applied the water flows through but the abrasive does not. The suction head is made according to the abrasive pattern desired.

In preform pulp moulding the process is very similar, but as normally the first gauze is of a particular shape, it is possible to remove this shaped gauze with the pulp attached and place it in the second abrasive slurry bank; a mask can be provided behind the gauze to define the shape of the vacuum suction area and so the abrasive deposit. If the pulp moulding is removed from the first gauze it would be placed on a second gauze in the abrasive slurry bank.

Resins may be precipitated onto the fibres or into the pulping machine before the first gauze in order to assist the adhesion of the grains to the layer of mix or pulp.

The grains may be agitated in water, sprayed, rolled, sprinkled or applied by an electrical charge to the mix, the applying heads or other devices having the configuration desired in the finished product. In the case of continuous sheet material made according to the invention the grain may be applied without vacuum by sprinkling it in the desired configuration from an above-work conveyor or by the individual system during movement of the carrying and bonding media mix.

Alternatively the grains may be dispersed in the desired configuration in a lattice or web of soluble bonding material which under the conditions of moulding will dissolve and allow the grains to fall into the cavities formed by the web or lattice. The web or lattice may be of any suitable material such as gelatine, half cured synthetic resin or thermoplastic material. This web if dry moulded will break down under the heat and dissolve or act as a plasticizer so that the grain, and a filler if mixed with the grain, will become embedded in the carrying medium and bonding medium mix.

In all the various ways of orientating the grain to the configuration desired, several layers of mix and grain may be put into the mould in superposed relation, the grain configuration in each layer being varied as desired to produce at the cutting or like surface the degree of saw-effect required. Also the grains may be in all one size or a variety of sizes of grain.

Referring to Figs. 10–14 the corrugations 30 may be regularly curved in cross-section, such as a sine curve for example (see Fig. 10), or they may be of rectangular (Fig. 11), triangular (see Fig. 12) or any other cross section. The corrugated layers may be arranged in interlocking relationship i.e. the crests 32 facing the underside 34 of the crests of the next layer above (as in Fig. 10), or staggered so that the crests of one layer face the underside of valleys in the next layer above (see Fig. 13). The corrugations may touch so that in the last named arrangement the spaces between the corrugations will in cross section form ovals 36, rectangles 38, diamonds 40 etc. according to the shape of the corrugations (see Fig. 14).

The corrugated layers may not touch in which case either a wavy cross section is formed or a cross section having alternate thick and thin portions 35 (Fig. 13).

In a further formation shown in Fig. 15 the layers may be separated by flat sheets 42 of non-abrasive material or by corrugated sheets whose corrugations are larger or smaller or by a lattice work or other shaped non-abrasive layers. Outer flat non-abrasive sheets 44 may also be used (Figs. 13 and 15) so that the disc is suitable for edge cutting whereas the constructions of Figs. 2, 10, 11, 12 and 14 can be used for edge or side face cutting, grinding or polishing as well as for edge cutting so that the disc is suitable for edge cutting unlike the construction in Figs. 2, 10, 11, 12 and 14 which can be used for edge or surface grinding or cutting. The abrasive layers may be arranged with corrugated medium layers having different corrugation curves, so that the thickness of the abrasive corrugations vary. Any other suitable combination of the layers may be employed as will be understood.

The layers of grain will follow the corrugations of the carrying medium and thus in cross section will have varying thicknesses or undulations so that when the articles such as discs made from such materials are caused to move at high speed for grinding and like purposes a saw-like action will result. This will be particularly obtained where the cross sectional edges of the articles are brought into oblique contact with the surfaces being ground or similarly treated.

In Fig. 16 the constitution of an abrasive block 21 is shown diagrammatically, namely the abrasive grain 20 dispersed in a softer than abrasive mix of bonding medium 23 and fibrous cut pieces 25, such as corset cuttings, having their fibres frayed at the edges 27. In Fig. 17 such blocks 21 are shown embedded in the softer than abrasive material 29 mounted on a softer than abrasive base 31.

The abrasive characteristics of the elements will vary according to and will be defined by the materials used in their manufacture, including the formation and size of grain, the formation of the carrying medium layers and the type of bonding or locking materials employed.

The abrasive grains are bonded together and/or to the carrying medium by any suitable adhesive such as described above for bonding the carrying medium. The grains themselves may be bound together by a suitable bonding agent to form a mass which is sandwiched between the layers of carrying medium.

In making the abrasive elements in the form of sheets, discs or the like with corrugated materials, the corrugated carrying medium is wetted if required by any suitable wetting agent such as water, or by the bonding medium, to produce an impregnated or coated carrying medium which will adhere to the abrasive grains.

Suitable fillers and/or plasticizers and/or wetting agents may be added if required.

In making up various sheets, discs or the like or articles according to the invention a number of layers of carrying medium are built up with layers or other definite formations of abrasive grain arranged for example in rows or circles, and the grain layers may be flat, corrugated or of lattice or other formation as desired.

The layers of corrugated material before and/or after the abrasive is interspersed between them may be dried if necessary as is normally employed in known moulding processes, for example when using phenol formaldehyde resins, the resin used as a bonding medium may be polymerised by heat to a stage which prevents excessive flow within the moulds or platens of a heated press used for consolidating and curing mouldings to the required final characteristics.

In building up the laminated layers to form the final elements, a layer of abrasive material is laid over a sheet of carrying medium which is preferably corrugated, but may be flat or of other formation. A layer of corrugated or other shaped carrying medium is placed over the abrasive layer. Thus by adding layers of abrasive and carrying medium one above the other in any desired arrangement of them to the desired thickness of the final product, sheet or articles are prepared.

The corrugations may be arranged in straight, curved or wavy irregular lines, or circles, isolated patches or any other formation as desired, and the abrasive grains may be similarly interspaced or zoned always providing that the final product will in use produce intermittent abrasive action of a sawing character.

It is possible by moulding a mouldable abrasive mix of consistent formation to provide a saw like action by shaping the final product or by the shape of the mould i.e. a mixed material of abrasive grain, filter and bonding medium moulded to the shape of a sine curve or as otherwise described.

The desired combination of layers thus prepared is then loaded into a press and the appropriate pressing operations are carried out in a known manner.

The corrugated carrying medium layers may be made to collapse about the grains or to withstand the pressure of the press in a known manner as desired. During the final pressing operation the grains are also forced between layers. The result of this will be more pronounced in layers of soft texture than hard layers and a similar effect may be obtained by employing layers of lattice formation.

The layers of carrying medium may all be corrugated or latticed or only some may be of such formation, for example those inside or on the outside of the elements or a combination of these may be employed. The outer surface of the finished elements may be flat or corrugated or otherwise indented as desired.

One example of making such an element employing corrugated materials will now be given.

The mix is as follows:

| | Parts by weight |
|---|---|
| Carrying medium—corrugated layers of paper | 10 |
| cloth reinforcement layer | 2 |
| coconut shell | 1 |
| Abrasive | 54 |
| Adhesive or glue—Phenol/formaldehyde resinoid | 32 |
| Plasticizer—Tri-cresyl phosphate | 0.5 |
| Lubricant—Stearic acid | 0.5 |

In this example the cloth reinforcement is interposed between the layers of corrugated paper to give flexual strength to the final product.

The corrugated paper layers are coated with adhesive as by spraying or passing through rollers to provide major adhesive layers within the concave portions of the corrugations. The abrasive grain is then applied as by sprinkling with or without further applications of adhesive until the concave corrugations are substantially filled.

The layer thus formed is then dried in an air circulating oven to the required consistency for the cure. A number of layers are then loaded in superposed relation into a mould and submitted to a pressure of about ½ ton per square inch at about 150°–170° C. This may be carried out in any suitable apparatus such as an hydraulic press. To assist ejection of the finished product, a lubricant such as wax may be coated over the mould before loading it.

The moulds are shaped so that the moulded products such as discs or sheets are in the final shapes and sizes required.

The moulding, pressing or other method of compressing is carried out under conditions of heat and pressure normally used in so treating the carrying and bonding materials employed, whereby the mix with the grains is transformed into a solid or substantially solid mass. By the use of suitable plasticizers in the requisite quantity the degree of flexibility or non-brittleness required is obtained.

The proportion of grain to the other constituents may me varied according to the type of final product required.

While this invention relates particularly to the production of abrasive elements such as wheels or discs, other shapes such as sheets or rods may be produced if desired.

I claim:

1. An abrasive element comprising a solid, tough, hard wearing, substantially evenly mixed softer than abrasive mass of a carrying medium of at least one material from a group including fibrous materials and thread-like materials and of a curable bonding medium, and abrasive blocks of said mass having abrasive grains evenly mixed therein, all of said blocks being disposed in spaced relation and at least partially embedded in said mass of carrying and bonding media, whereby in use said element is hard wearing and non-clogging.

2. An abrasive element made up of blocks of abrasive mass each consisting of abrasive grain, a fibrous carrying medium and a curable bonding medium evenly mixed, said blocks being embedded in spaced relationship throughout a mass of material similar to said blocks but without said abrasive grains, the whole having been cured to form a solid, tough, even wearing, non-clogging abrasive element which in use exhibits an intermittent wearing action.

3. An abrasive element made up of blocks of abrasive mass having abrasive grain embedded in and bonded by an adhesive to a softer than abrasive grain carrying medium consisting of frayed cut lengths of materials so interspersed as to form an intertwined mass, the blocks being separated by non-abrasive material which is softer than the abrasive grain whereby, in use, the elements provide an intermittent abrasive action and wear substantially evenly.

4. An abrasive element according to claim 3 in which the mass contains at least one of a group including plasticizers, lubricants, and fillers.

5. An abrasive element according to claim 3 in which the carrying medium consists of frayed cut-lengths of corset cuttings.

6. An abrasive element according to claim 3 in which synthetic adhesive is employed as the bonding medium.

7. An abrasive element made up of a number of layers each layer having blocks of abrasive mass, each constituted by an even mixture of abrasive grains, a fibrous carrying medium and a curable bonding medium, said blocks in each layer being embedded in spaced relationship in strips in and bonded by curing to softer than abrasive grain material of evenly mixed fibrous carrying medium and a curable bonding medium, said layers being bonded by curing in superposed relationship with the strips of one layer in staggered relationship to said strips of each adjoining layer, the whole having been cured onto an integral solid, tough, even wearing, non-clogging element which in use exhibits an intermittent wearing action on a work piece.

8. An abrasive element made up of superposed layers alternately of abrasive mass and softer than abrasive material, said abrasive layers comprising blocks of abrasive mass having abrasive grain embedded in and bonded to softer than abrasive grain carrying medium with said blocks of grain disposed in strips between strips of softer than abrasive grain carrying medium, said non-abrasive layers comprising corrugated material the concavities of which are filled by the abrasive layers, the strip like blocks of abrasive mass in successive abrasive layers being in staggered relationship, whereby in use said elements provide an intermittent abrasive action and wear substantially evenly.

9. An abrasive element made up of a number of non-abrasive corrugated layers in superposed relationship with the valleys of the corrugations of all the layers substantially parallel, said valleys being filled with a substantially homogeneous abrasive mass consisting of blocks of abrasive mass having abrasive grain, a bonding medium such as phenol/formaldehyde resinoid glue, a carrying medium of roughened cut lengths of fibrous material, lubricants and plasticizers, the whole having been moulded by heat and pressure into a solid mass which in use will provide a saw action.

10. An abrasive element comprising a base of resilient moulded material softer than abrasive grain and in which are embedded blocks of abrasive material, the base being a homogeneously mixed mass of a carrying medium and a bonding medium and the blocks being a similar mixture to the base but with added abrasive grain the whole being homogeneously mixed throughout, the blocks being assembled in the base prior to moulding and the whole being molded into the element, the carrying medium and bonding medium being of materials which in use will wear away quickly leaving the cutting faces of the abrasive grains exposed in blocks separated by non-abrasive zones whereby the element will grind the surface of a work piece with a saw-like action.

References Cited in the file of this patent

UNITED STATES PATENTS

| | | |
|---|---|---|
| 794,495 | Gorton | July 11, 1905 |
| 794,496 | Gorton | July 11, 1905 |
| 816,461 | Gorton | Mar. 27, 1906 |
| 847,190 | Landis | Mar. 12, 1907 |
| 888,129 | Tone | May 19, 1908 |
| 977,325 | Nichols | Nov. 29, 1910 |
| 980,882 | Nichols | Jan. 3, 1911 |
| 1,022,692 | Meyers | Apr. 9, 1912 |
| 1,063,380 | Peirce | June 3, 1913 |
| 1,435,721 | McIntosh et al. | Nov. 14, 1922 |
| 1,507,836 | King | Sept. 9, 1924 |
| 1,657,784 | Bergstrom | Jan. 31, 1928 |
| 1,753,201 | Edlich | Apr. 8, 1930 |
| 1,912,069 | Doermann | May 30, 1933 |
| 2,015,658 | Bezzenberger | Oct. 1, 1935 |
| 2,232,389 | Jurkat | Feb. 18, 1941 |
| 2,408,148 | Longbotham | Sept. 24, 1946 |
| 2,545,676 | Small | Mar. 20, 1951 |
| 2,605,592 | Cosmos | Aug. 5, 1952 |
| 2,627,145 | Frigstad | Feb. 3, 1953 |
| 2,704,916 | Peterson | Mar. 29, 1955 |

FOREIGN PATENTS

| | | |
|---|---|---|
| 313,950 | Great Britain | Jan. 9, 1930 |